United States Patent [19]

Guez et al.

[11] Patent Number: 5,293,456
[45] Date of Patent: Mar. 8, 1994

[54] OBJECT RECOGNITION SYSTEM EMPLOYING A SPARSE COMPARISON NEURAL NETWORK

[75] Inventors: Ygal G. Guez, Philadelphia; Richard G. Stafford, Chadds Ford, both of Pa.

[73] Assignee: E. I. du Pont de Nemours and Company, Wilmington, Del.

[21] Appl. No.: 723,348

[22] Filed: Jun. 28, 1991

[51] Int. Cl.⁵ .............................................. G06K 9/66
[52] U.S. Cl. ...................................... 395/24; 395/21; 395/22; 382/14
[58] Field of Search ..................... 395/21, 22, 23, 24

[56] References Cited

U.S. PATENT DOCUMENTS

| | | | |
|---|---|---|---|
| 4,803,736 | 2/1989 | Grossberg et al. | 382/22 |
| 4,805,225 | 2/1989 | Clark | 382/15 |
| 4,876,731 | 10/1989 | Loris et al. | 382/40 |
| 4,953,099 | 8/1990 | Jourjine | 364/513 |
| 4,979,126 | 12/1990 | Pao et al. | 364/513 |
| 4,995,090 | 2/1991 | Singh et al. | 382/50 |
| 5,058,179 | 10/1991 | Denker et al. | 382/14 |
| 5,059,814 | 10/1991 | Mead et al. | 307/201 |
| 5,067,164 | 11/1991 | Denker et al. | 382/15 |
| 5,109,431 | 3/1992 | Nishiya et al. | 382/30 |
| 5,150,425 | 9/1992 | Martin et al. | 382/14 |
| 5,181,256 | 1/1993 | Kamiya | 382/14 |

FOREIGN PATENT DOCUMENTS 1-299876  1/1989  European Pat. Off. .

OTHER PUBLICATIONS

Lippmann, R. P., "An Introduction to computing with Neural Nets," IEEE ASSP Mag., Apr. 1987, 4-22.
Cortes et al., "A Network System for Image Segmentation", IJCNN 1989, I-121–I-125.
Lippmann, R. P., "Pattern Classification Using Neural Networks", IEEE Communications Mag., Nov. 1989, 47-64.
Le Cun et al., "Handwritten Digit Recognition:Applications Neural Network Chips and Automatic Learning", IEEE Comm-Mag., Nov. 1989, 41-46.
Iwata et al., "A Large Scale Neural Network 'Comb-NET' and its Application to Chinese Character Recognition", Intl. Neural Network Conf., Jul. 1990, 83-86.
Jacobs et al., "Adaptive Mixtures of Local Experts", Neural Computation May 3, 1991, 79-87.

(List continued on next page.)

*Primary Examiner*—Michael R. Fleming
*Assistant Examiner*—Robert W. Downs

[57] ABSTRACT

A neural network for comparing a known input to an unknown input comprises a first layer for receiving a first known input tensor and a first unknown input tensor. A second layer receives the first known and unknown input tensors. The second layer has at least one first trainable weight tensor associated with the first known input tensor and at least one second trainable weight tensor associated with the first unknown input tensor. The second layer includes at least one first processing element for transforming the first known input tensor on the first trainable weight tensor to produce a first known output and at least one second processing element for transforming the first unknown input tensor on the second trainable weight tensor to produce a first unknown output. The first known output comprises a first known output tensor of at least rank zero and has a third trainable weight tensor associated therewith. The first unknown output comprises a first unknown output tensor of at least rank zero and has a fourth trainable weight tensor associated therewith. The first known output tensor and the first unknown tensor are combined to form a second input tensor. A third layer receives the second input tensor. The third layer has at least one fifth trainable weight tensor associated with the second input tensor. The third layer includes at least one third processing element for transforming the second input tensor on the fifth trainable weight tensor, thereby comparing the first known output with the first unknown output and producing a resultant output. The resultant output is indicative of the degree of similarity between the first known input tensor and the first unknown input tensor.

4 Claims, 10 Drawing Sheets

OTHER PUBLICATIONS

Kohonen, T., "Correlation Matrix Memories," IEEE Transactions on Computers, Apr. 1972, 353–359.

Sholl, H. A., "Modeling of an Operator's Performance in a Short-Term Visual Information Processing Task," IEEE Trans. on Sys., Man. and Cybernetics, Jul. 1972, 352–362.

Fukushima, K. "Self-organizing Neural Network Models for Visual Pattern Recognition", Acta Neurochirurgica. Suppl. 41, 51–67 (1987).

Fukushima, K. "A Neural Network Model for Selective Attention in Visual Pattern Recognition", Biol. Cybern. 55, 5–15 (1986).

*Parallel Distributed Processing, Volume 1: Foundations,* Rumelhart, McClelland and the PDP Research Group, editors, MIT Press, Cambridge, Mass. (1986, Sixth printing 1987), Chapter 8, pp. 318–362.

IEEE International Conf. on Neural Networks, vol. 2, 24 Jul. 1988, San Diego, USA, pp. 525–532, SAMAD, 'Towards Connectionist Rule-Based Systems'.

OBJECT RECOGNITION SYSTEM EMPLOYING A SPARSE COMPARISON NEURAL NETWORK

BACKGROUND OF THE INVENTION

1. Field of the Invention

The present invention relates to a sparse comparison neural network which compares a known input to an unknown input, and a method of comparing a known input to an unknown input.

2. Description of the Related Art

A neural network is an information processor which simulates biological neural functions in a computer. Neural networks may be used for visual pattern recognition. A type of neural network currently utilized for pattern recognition is a feedforward network which is trained using back-propagation techniques. Such a network is described in *Parallel Distributed Processing, Volume I: Foundations*, by D. E. Rumelhart et al. (MIT Press, 1987).

A conventional, three-layer, fully-connected, feedforward neural network trained using back-propagation techniques is shown generally at 10 in FIG. 1. The feedforward neural network as shown in FIG. 1 comprises an input layer 12, a hidden layer 14 and an output layer 16. Input layer 12 receives an input. Input layer 12 includes a plurality of artificial neurons, or nodes, 18. Hidden layer 14 receives inputs from input layer 12, and a weight is associated with each of the inputs to the hidden layer. Hidden layer 14 comprises a plurality of artificial neurons, or processing nodes, 20. A plurality of interconnections 22 distributes information from each node 18 in input layer 12 to each processing node 20 in hidden layer 14. Output layer 16 receives inputs from hidden layer 14, and a weight is associated with each of the inputs to the output layer. Output layer 16 also comprises a plurality of artificial neurons, or processing nodes, 24. Nodes 18 in input layer 12 are of a passive nature compared to processing nodes 20 and 24 in hidden layer 14 and in output layer 16, respectively. Processing nodes 20 and 24 perform a linear or non-linear transformation. A plurality of interconnections 26 distributes the information processed by each processing node 20 in hidden layer 14 to each processing node 24 in output layer 16. In each of the input and hidden layers, one of the nodes is fixed to a constant value and operates with its associated weight as an effective bias.

The weights associated with the inputs to the hidden layer and the output layer are derived during a training process. When the weights have been set to correct levels, a complex stimulus pattern at the input layer is sent to the hidden layer, resulting in an output pattern. The network is trained by feeding it a succession of input patterns and corresponding expected output patterns. The network "learns" by measuring the difference, at each output element, between the expected output pattern and the pattern that it just produced. Having done this, the weights are modified by a learning algorithm to provide an output pattern which more closely approximates the expected output pattern, while minimizing the error over the spectrum of input patterns.

While pattern recognition using a feedforward neural network trained using back-propagation techniques is known, successful applications in areas with large input arrays, e.g., in image processing and machine vision, are hindered by the fact that fully-connected, feedforward networks require large numbers of processing elements and weights in the hidden layer and the output layer for distributing information. Even though large back-propagation networks are feasible to build in principle, the major shortcoming of such networks is the training time required. The back-propagation training time for practically sized imaging feedforward networks can rapidly approach geological time periods on the largest supercomputers. Thus, the need exists for reducing the training time in neural networks having large input arrays.

Moreover, a back-propagation training algorithm for a known neural network can only be fed very rudimentary information for estimating feedback error. The teacher may give only a simple code, corresponding to a specific pattern that is being learned, at the network output. Therefore, the need also exists for developing a feedforward neural network trained by a back-propagation algorithm where considerably more information can be processed.

Accordingly, it is an object of the present invention to decrease the required network size, both in number of processing elements and in the number of connections between elements, compared to known feedforward neural networks of similar classification capacity.

In addition, it is an object of the present invention to provide a neural network for performing pattern recognition which significantly decreases the back-propagation training time compared to known networks of equivalent size which are applied to identical pattern recognition problems.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

The present invention is directed to a comparison neural network where the input data can be separated into discrete classes and where a comparison, or known, pattern can be provided to assist the network in assigning an unknown input pattern to a specific class. The neural network of the present invention separates a standard, fully-connected, layered, feedforward network into a sparsely connected network of parallel processing networks. Each parallel processing network separately processes the known and the unknown pattern, thereby eliminating the need to fully connect the artificial neurons in the first, or input, layer with the processing elements in the second, or hidden, layer and the processing elements in the hidden layer with the processing elements in the output, or third, layer. Such an approach removes the mutual interference between weights that occurs during learning for a fully connected network. Accordingly, with the present invention, the network training time is significantly decreased, and the number of total patterns recognized is increased.

To achieve the foregoing objects, and in accordance with the purposes of the invention as embodied and broadly described herein, there is provided a neural network comprising a first, second and third layer. The first layer receives a first input which comprises a first known input tensor and a first unknown input tensor. The second layer receives the first known and unknown input tensors and has at least one first trainable weight tensor associated with the first known input tensor and at least one second trainable weight tensor associated with the first unknown input tensor. The second layer includes a first processing element for transforming the first known input tensor on the first trainable weight tensor to produce a first known output and a second processing element for transforming the first unknown input tensor on the second trainable weight tensor to produce a first unknown output. The first known output comprises a first known output tensor of at least rank zero having a third trainable weight tensor associated therewith. The first unknown output comprises a first unknown output tensor of at least rank zero having a fourth trainable weight tensor associated therewith. The first known and unknown output tensors are combined to form a second input tensor having a fifth trainable weigh tensor associated therewith. The third layer receives the second input tensor and includes a third processing element for transforming the second input tensor on the fifth trainable weight tensor, thereby comparing the first known output with the first unknown output and producing a resultant output. The resultant output is indicative of the degree of similarity between the first known input tensor and the first unknown input tensor.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiments given below, serve to explain the principles of the invention.

DESCRIPTION OF THE PREFERRED EMBODIMENTS

Figure 1:
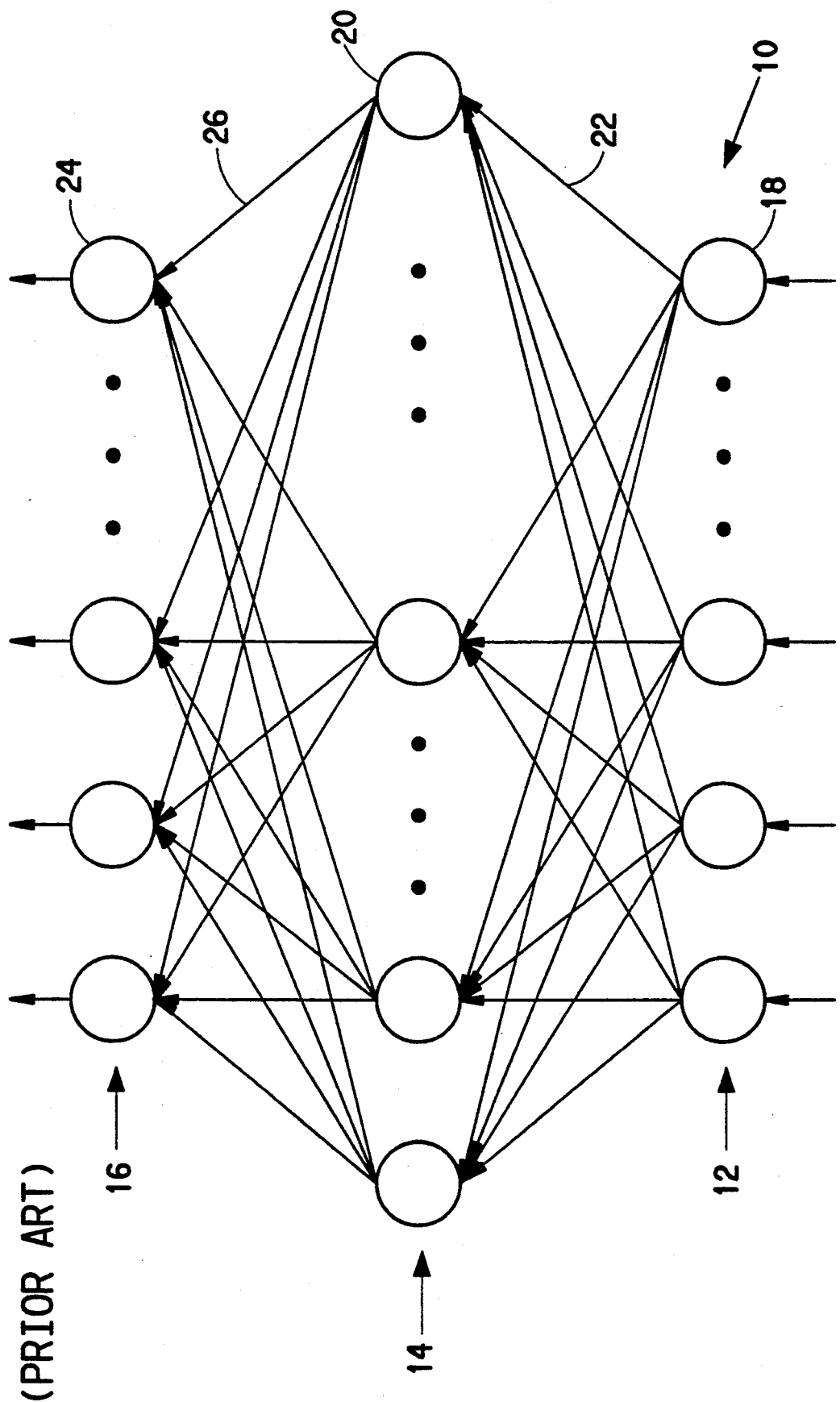
FIG. 1 is a schematic view of a feedforward neural network trained using back-propagation techniques of the prior art.
Figure 2:
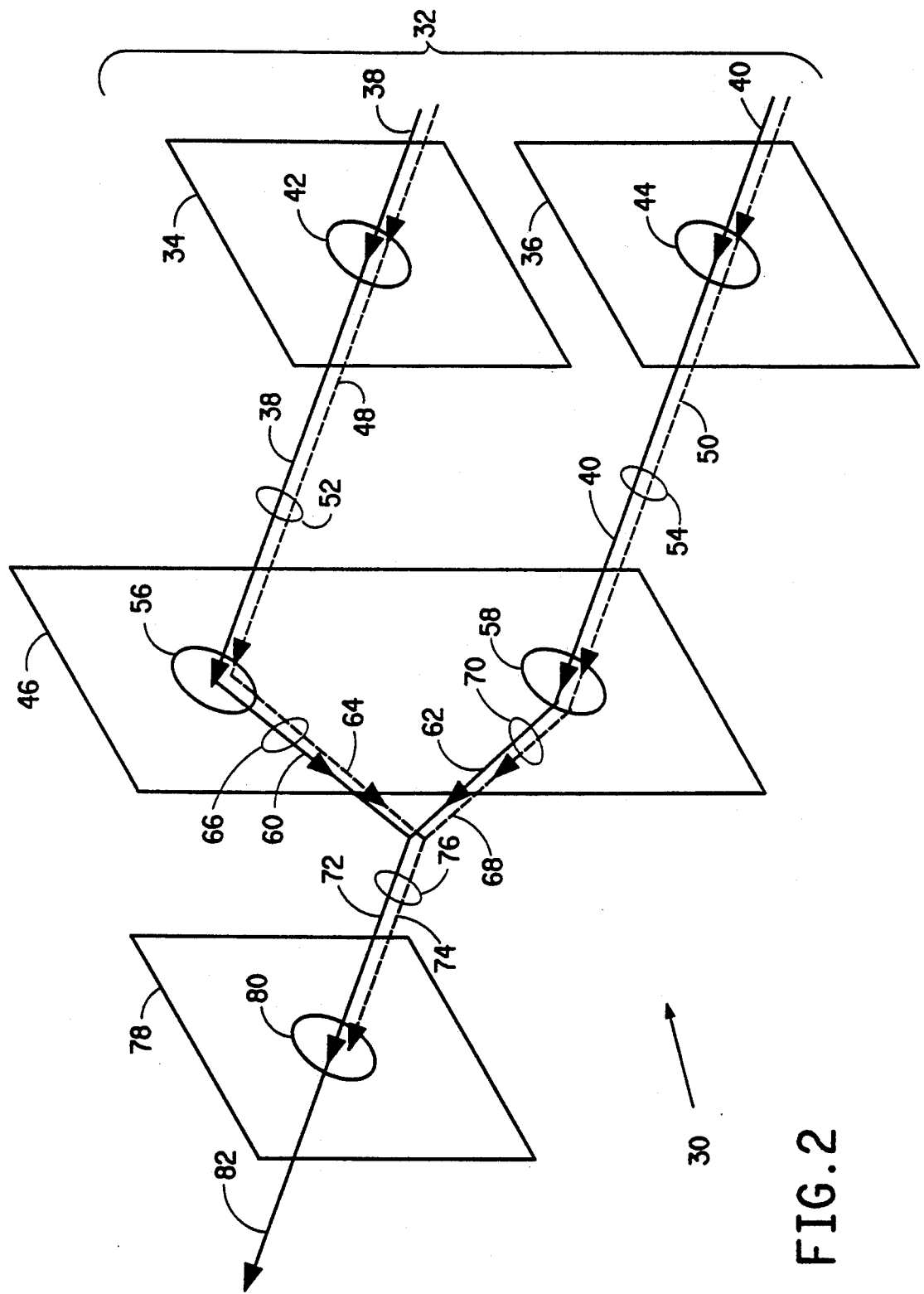
FIG. 2 is an isometric view of a first embodiment of a neural network which incorporates the teachings of the present invention.

Reference will now be made in detail to the present preferred embodiments of the invention as illustrated in the accompanying drawings. FIG. 2 shows the fundamental aspects of a neural network according to the first embodiment of the present invention. The neural network of the first embodiment is shown generally at 30. Neural network 30 comprises a first, or input, layer 32. First layer 32 comprises a known component 34 and an unknown component 36 and receives a first known input tensor 38 and a first unknown input tensor 40. Known component 34 includes a first node 42 for receiving the first known input tensor, and unknown component 36 includes a second node 44 for receiving the first unknown input tensor. The first known input tensor and the first unknown input tensor may each comprises a first, or equal, number of known and unknown input data values. Alternatively, the first known input tensor may comprise a first number of known input data values and a second, or different, number of unknown input data values, where the first and second numbers are not necessarily equal to each other.

Neural network 30 also comprises a second, or hidden, layer 46. Second layer 46 has at least one first trainable weight tensor 48 associated with the first known input tensor and at least one second trainable weight tensor 50 associated with the first unknown input tensor. First trainable weight tensor 48 comprises at least one first trainable weight 52 and may comprise a plurality of trainable weights. Second trainable weight tensor 50 comprises at least one second trainable weight 54 and may comprise a plurality of trainable weights. Second layer 46 includes first processing means for transforming the first known input tensor on the first trainable weight tensor to produce a first known output. The first processing means comprises at least one first processing node 56 as shown in FIG. 2. Similarly, the second layer includes second processing means for transforming the first unknown input tensor on the second trainable weight tensor to produce a first unknown output. The second processing means comprises at least one second processing node 58 as shown in FIG. 2. The first known output comprises a first known output tensor 60 as shown in FIG. 2 of at least rank zero, and the first unknown output comprises a first unknown output tensor 62 of at least rank zero. A third trainable weight tensor 64 is associated with first known output tensor 60. Third trainable weight tensor 64 comprises at least one third trainable weight 66. A fourth trainable weight tensor 68 is associated with first unknown output tensor 62. Fourth trainable weight tensor 68 comprises at least one fourth trainable weight 70. The first known output tensor from first processing node 56 and the first unknown output tensor from second processing node 58 are combined to form a second input tensor 72 as shown in FIG. 2, and third trainable weight tensor 64 is combined with fourth trainable weight tensor 68 to form a fifth trainable weight tensor 74 associated with second input tensor 72. In this context, the term "combined" means forming an ordered set of scalar elements. Fifth trainable weight tensor 74 comprises at least one fifth trainable weight 76. In general, each of the first through fifth trainable weights may be equal or different in value and in number from each of the other trainable weights of the other trainable weight tensors.

The neural network according to the present invention further comprises a third, or output, layer 78 for receiving the second input tensor. Third layer 78 includes third processing means for transforming the second input tensor on the fifth trainable weight tensor. The third processing means comprises at least one third processing node 80 as shown in FIG. 2. Third processing node 80 transforms second input tensor 72 on fifth trainable weight tensor 74, thereby comparing the first known output with the first unknown output. As a result of the transformation performed by the third processing means, a resultant output, shown at 82 in FIG. 2, is produced. The resultant output is indicative of the degree of similarity between the first known input tensor and the first unknown input tensor. In this way, known and unknown inputs, such as images, may be compared.

It should be noted that the dimensionality of each of the first, second and third layers of the first embodiment may be a scalar, vector, matrix or tensor of any degree. The first and second processing means of the second layer and the third processing means of the third layer may all perform a linear transformation, or they may all perform a non-linear transformation. Alternatively, the first, second and third processing means may perform any combination of linear and non-linear transformations. Also, it should be noted that each node has a trainable input bias, not shown.

The present invention further comprises a method of comparing a known input with an unknown input which corresponds to the first embodiment. The known input comprises a first known input tensor, and the unknown input comprises a first unknown input tensor. According to the method corresponding to the first embodiment of the present invention, the first known input tensor is transformed on a first trainable weight tensor associated with the first known input tensor to produce a first known output. The first unknown input tensor is transformed on a second trainable weight tensor associated with the first unknown input tensor to produce a first unknown output. The first known output comprises a first known output tensor of at least rank zero having a third trainable weight tensor asociated therewith. The first unknown output comprises a first unknown output tensor of at least rank zero having a fourth trainable weight tensor associated therewith. The first known output tensor and the first unknown output tensor are combined to form a second input tensor, and the third trainable weight tensor is combined with the fourth trainable weight tensor to form a fifth trainable weight tensor associated with the second input tensor. The second input tensor is transformed on the fifth trainable weight tensor, thereby comparing the first known output with the first unknown output. A resultant output which is indicative of the degree of similarity between the first known input tensor and the first unknown input tensor is produced.

Network equations, feedforward equations and error derivative equations have been developed for the first embodiment of the present invention and are given below. These equations are necessary to train, test and run a neural network as described above in the embodiment of FIG. 2. The equations below have been developed for a two-dimensional input, but can be extended to any dimension without any loss of generality.

The feedforward comparison region network equations define the network as follows:

Third layer: $A1(X1,Y1), X1 = [1,X1M], Y1 = [1,Y1M]$ (1)

Second layer: $A2(X2,Y2,R), X2 = [1,X2M],$
$Y2 = [1,Y2M], R = [U,C]$ (2)

First layer: $A3(X3,Y3,R), X3 = [1,X3M],$
$Y3 = [1,Y3M], R = [U,C]$ (3)

R: Region, where R denotes all nodes in the first layer or the second layer that are associated with, or connected to, the unknown region U or the known region C.

It should be noted that the convention in denoting the values is opposite the layer designation in the first and third layer in order to accommodate the increased complexity of the back-propagation equations compared to the feedforward equations.

W1(X1,Y1,X2,Y2,R): Weight connecting output of A2(X2,Y2,R) to input of A1(X1,Y1)
W2(X2,Y2,X3,Y3,R): Weight connecting output of A3(X3,Y3,R) to input of A2(X2,Y2,R)
WT1(X1,Y1): A1(X1,Y1) threshold weight
WT2(X2,Y2,R): A2(X2,Y2,R) threshold weight Specific variable limits of the embodiment of FIG. 2 are set as follows:

(X1M=1, Y1M=1), (X2M=1, Y2M=2), (X3M=2, Y3M=2), R=[U,C]. (4)

The feedforward equations describe how the input tensors are fed forward to the output layer. The feedforward equations for the first embodiment of the present invention are defined as follows:

$$A1(X1,Y1) = F(S1(X1,Y1)) \quad (5)$$

$$A2(X2,Y2,R) = F(S2(X2,Y2,R)) \quad (6)$$

where F is the non-linear transformation of a linear function S, and where S is a function of the weight for a node of the second and third layers, and the input to each of these layers as defined in following equations (7) and (8).

$$S1(X1,Y1) = \Sigma(W1(X1,Y1,X2,Y2,R)*A2(X2,Y2,R)) + \quad (7)$$
$$WT1(X1,Y1)$$

$X2 = [1,X2M]$
$Y2 = [1,Y2M]$
$R = [U,C]$ $$S2(X2,Y2,R) = \Sigma(W2(X2,Y2,X3,Y3,R)*A3(X3,Y3,R)) + \quad (8)$$
$$WT2(X2,Y2,R)$$

$X3 = [1,X3M]$
$Y3 = [1,Y3M]$
$R = [U,C]$

The error derivative equations are used for minimizing the error function with respect to the weights and thus allow the back-propagation algorithm to be performed. The following equations are general, with no specific error function being assumed.

The error derivative variables are defined as follows:
E(A1) is a measure of the error between the neural network activation outputs A1(X1,Y1) and the target activation output T(X1,Y1), for all nodes in the third layer.

$\dfrac{\partial E(A1)}{\partial W1(X1,Y1,X2,Y2,R)}$ : Partial derivative of $E$ wrt $W1$ -continued $\dfrac{\partial E(A1)}{\partial W2(X2,Y2,X3,Y3,R)}$ : Partial derivative of $E$ wrt $W2$ $\dfrac{\partial E(A1)}{\partial WT1(X1,Y1)}$ : Partial derivative of $E$ wrt $WT1$ $\dfrac{\partial E(A1)}{\partial WT2(X2,Y2,R)}$ : Partial derivative of $E$ wrt $WT2$ The derivatives for the third layer are given as follows:

$$\dfrac{\partial E(A1)}{\partial W1(X1,Y1,X2,Y2,R)} = G1(X1,Y1) \cdot A2(X2,Y2,R) \quad (9)$$

and $$\dfrac{\partial E(A1)}{\partial WT1(X1,Y1)} = G1(X1,Y1) \quad (10)$$

where, $$G1(X1,Y1) = \dot{E}(A1(X1,Y1)) \cdot \dot{F}(S1(X1,Y1)) \quad (11)$$

$$\dot{E}(A1(X1,Y1)) = \dfrac{\partial E(A1)}{\partial A1(X1,Y1)} \quad (12)$$

$$\dot{F}(S1(X1,Y1)) = \dfrac{\partial F(S1(X1,Y1))}{\partial S1(X1,Y1)} \quad (13)$$

The derivatives for the second layer are given as follows:

$$\dfrac{\partial E(A1)}{\partial W2(X2,Y2,X3,Y3,R)} = G2(X2,Y2,R) \cdot A3(X3,Y3,R), \quad (14)$$

for all $(X3,Y3)$ in $R[U,C]$ and $$\dfrac{\partial E(A1)}{\partial WT2(X2,Y2,R)} = G2(X2,Y2,R) \quad (15)$$

where $$G2(X2,Y2,R) = \quad (16)$$

$$\Sigma G1(X1,Y1) \cdot W1(X1,Y1,X2,Y2,R) \cdot \dot{F}(S2(X2,Y2,R))$$

$X1 = [1,X1M]$
$Y1 = [1,Y1M]$ $$\dot{F}(S2(X2,Y2,R)) = \dfrac{\partial F(S2(X2,Y2,R))}{\partial S2(X2,Y2,R)} \quad (17)$$

The trainable weights of the first, second and third trainable weight tensors are determined during a known back-propagation training procedure which uses the above equations (1)–(17) in which a known set of training data and comparison data is presented to the network and adjustments in weights are made by minimizing an error function for the training set so that the network assigns the training input to either the known input tensor or the unknown input tensor. During training, the network is given information in two ways: 1) the teacher provides a target output for each input tensor as done in the prior art; and 2) according to the present invention, a known input tensor is provided at the input of the network and fed forward simultaneously with the unknown input tensor to be compared or recognized. Once the network has been trained, the known input tensor, or its equivalent representation at the first layer, continues to be input to the network during the comparison process.

The neural network of the present invention is a feed-forward network which, during training, has error information that is back-propagated and which has information on the input tensor to be recognized that is forward-propagated through the network. The teacher provides both feedforward and feedback information during training. Also, during testing and performing applications, the feedforward information continues to be supplied. Thus, with the present invention, more information may be provided to the network in contrast to comparison neural networks of the prior art, because information is also being fed forward in addition to being back-propagated. The advantage to this approach is that the network size is decreased, as well as the number of training cycles required for weight convergence.

Figure 3:
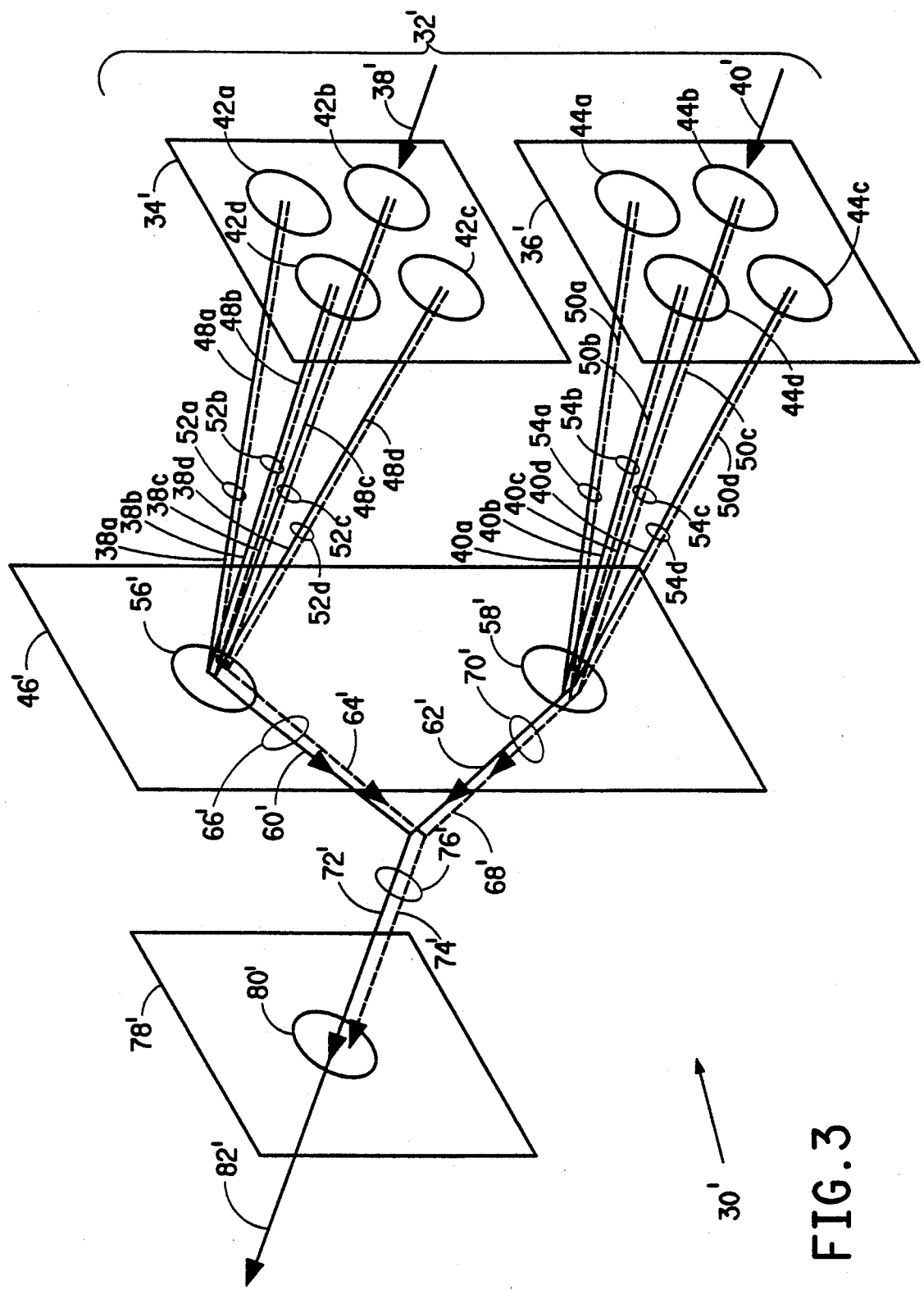
FIG. 3 is an isometric view of a second embodiment of the neural network of the present invention.

FIG. 3 illustrates a second embodiment of the present invention where elements corresponding to the embodiment of FIG. 2 are designated with a like reference numeral and a prime ('). In the embodiment of FIG. 3, known component 34' comprises a plurality of known input data values, and unknown component 36' comprises a plurality of unknown input data values. Also, in the embodiment of FIG. 3, the number of known input data values is equal to the number of unknown input data values. Specifically, in FIG. 3, there are four known input data values and four unknown input data values for each node 42a–42d and 44a–44d. Although four known and unknown input data values are shown, the number of known and unknown input data values may comprise any positive integer. First known input tensor 38' is divided among each of the known input data values and is output from known component 34' as first known input tensors 38a–38d. Similarly, first unknown input tensor 40' is divided among each of the unknown input data values and is output from unknown component 36' as first unknown input tensors 40a'–40d'. Also, in the second embodiment of FIG. 3, second layer 46' has four first trainable weight tensors 48a–48d associated with each first known input tensor 38a–38d, respectively and four second trainable weight tensors 50a–50d associated with each first unknown input tensor 40a–40d. In all other respects, the embodiment of FIG. 3 is like the embodiment of FIG. 2.

Figure 4:
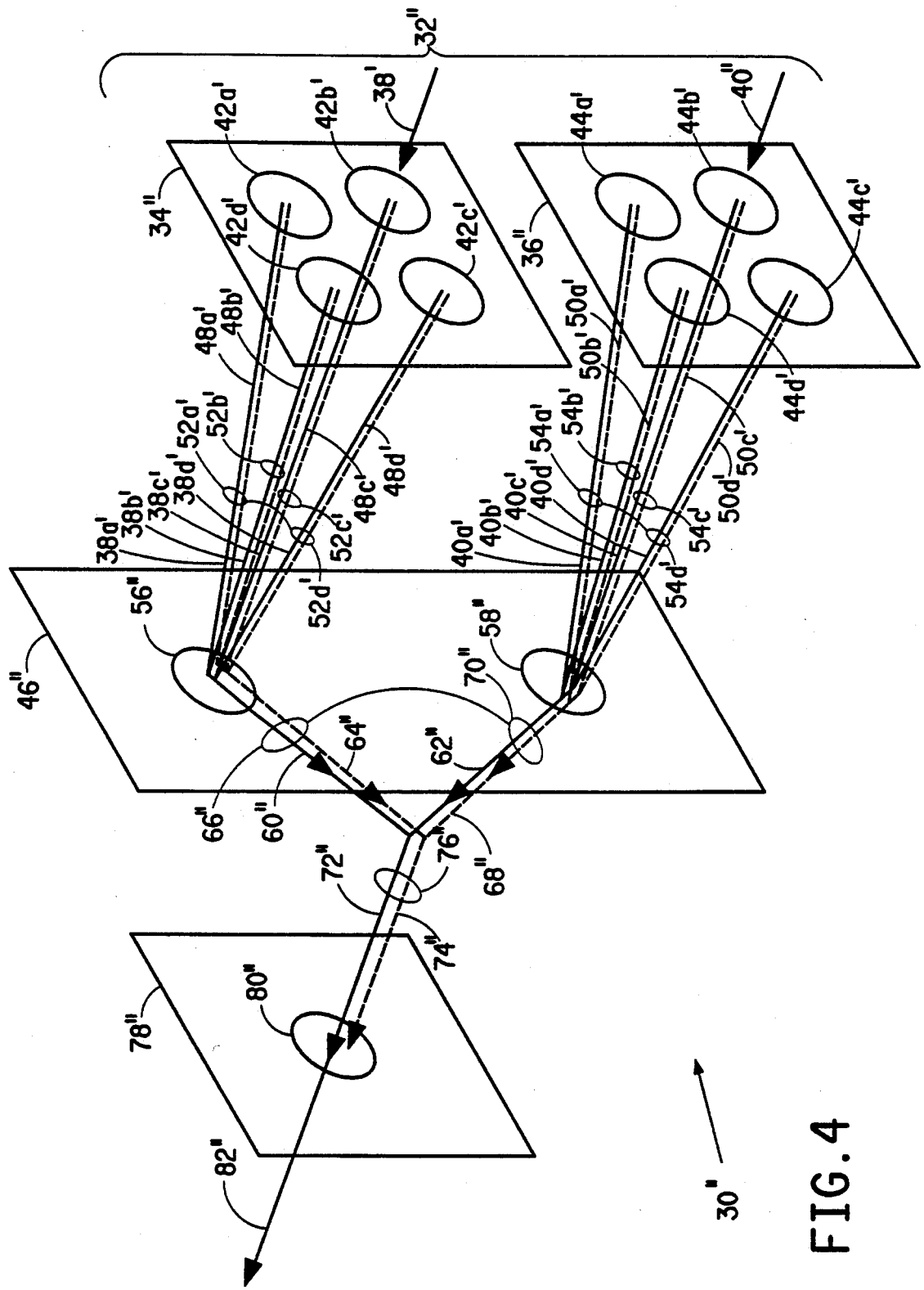
FIG. 4 is an isometric view of a neural network according to another embodiment of the present invention.

FIG. 4 illustrates a third embodiment of the present invention where elements corresponding to the embodiments of FIGS. 2 and 3 are designated with a like reference numeral and a prime ('). The embodiment of FIG. 4 is like the embodiment of FIG. 3 with the additional constraint that the first trainable weight tensor is equal to the second trainable weight tensor, and the third trainable weight tensor is equal to the fourth trainable weight tensor. This equality is illustrated by the connection between the first and second trainable weights and the connection between the third and fourth trainable weights in FIG. 4. By "equal", it is meant that the trainable weight tensors have the same number of elements, and that the value of the corresponding weights of each trainable weight tensor is the same.

The weight constraint equations necessary to implement the comparison neural network shown in FIG. 4 are set forth below. These equations are applied in addition to equations (1)–(17) above to form a complete solution to the comparison of a known input tensor with an unknown input tensor in accordance with the third embodiment of the present invention.

$$W1(X1,Y1,X2,Y2,U) = W1(X1,Y1,X2,Y2,C) \quad (18)$$

$$W2(X2,Y2,X3,Y3,U) = W2(X2,Y2,X3,Y3,C) \tag{19}$$

Figure 5:
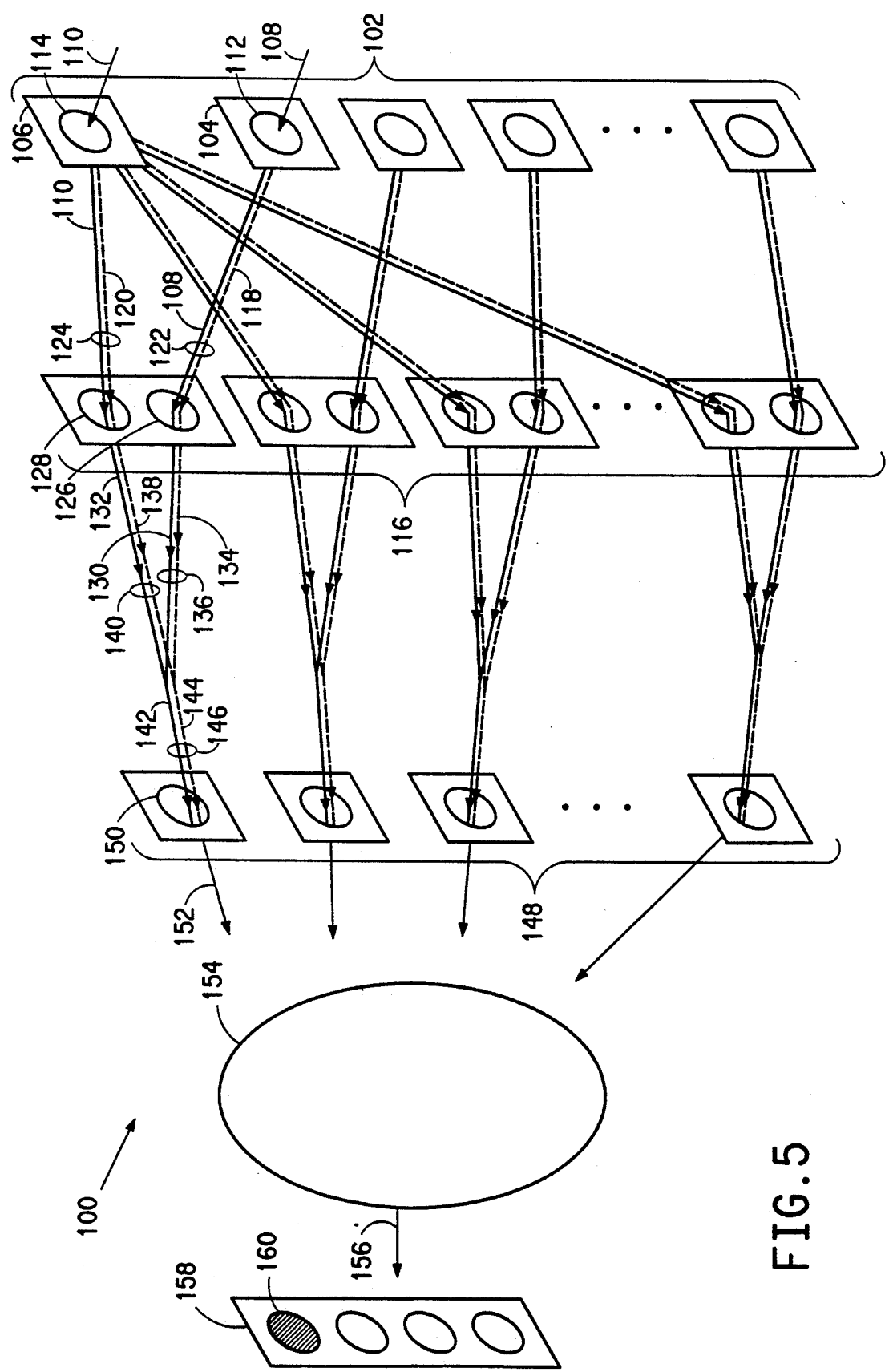
FIG. 5 is an isometric view of a neural network according to a further embodiment of the present invention.

In accordance with a fourth embodiment of the present invention, there is provided a neural network shown generally at 100 in FIG. 5. Neural network 100 comprises a plurality of parallel processing networks. Each parallel processing network comprises a first, or input, layer which, collectively, for all the parallel processing networks, is designated as 102. First layer 102 comprises a known component 104 and an unknown component 106. Known component 104 receives a first known input tensor 108, and first unknown component 106 receives a first unknown input tensor 110. Known component 104 includes a first node 112 for receiving the first known input tensor, and unknown component 106 includes a second node 114 for receiving the first unknown input tensor. As in the above-described embodiments, the first known input tensor and the first unknown input tensor may each comprise a first, or equal, number of known and unknown input data values. Alternatively, the first known input tensor may comprise a first number of known input data values and a second number of unknown input data values, where the first and second numbers are not necessarily equal to each other.

Each parallel processing networks of the fourth embodiment also comprises a second, or hidden, layer which, collectively, for all the parallel processing networks, is designated as 116 for receiving the first known input tensor and the first unknown input tensor. Second layer 116 has at least one first trainable weight tensor 118 associated with the first known input tensor and at least one second trainable weight tensor 120 associated with the first unknown input tensor. First trainable weight tensor 118 comprises at least one first trainable weight 122 and may comprise a plurality of trainable weights. Second trainable weight tensor 120 comprises at least one second trainable weight 124 and may comprise a plurality of trainable weights.

Second layer 116 of each parallel processing network includes first processing means for transforming the first known input tensor on the first trainable weight tensor to produce a first known output. The first processing means comprises at least one first processing node 126. Similalry, the second layer includes second processing means for transforming the first unknown input tensor on the second trainable weight tensor to produce a first unknown output. The second processing means comprises at least one second processing node 128. The first known output comprises a first known output tensor 130 as shown in FIG. 5 of at least rank zero, and the first unknown output comprises a first unknown output tensor 132 of at least rank zero. A third trainable weight tensor 134 is associated with first known output tensor 130. Third trainable weight tensor 134 comprises at least one third trainable weight 136. A fourth trainable weight tensor 138 is associated with first unknown output tensor 132. Fourth trainable weight tensor 138 comprises at least one fourth trainable weight 140. The first known output tensor from first processing node 126 and the first unknown output tensor from second processing node 128 are combined to form a second input tensor 142 as shown in FIG. 5, and third trainable weight tensor 134 is combined with fourth trainable weight tensor 138 to form a fifth trainable weight tensor 144 associated with second input tensor 142. As noted above, the term "combined" means forming an ordered set of scalar elements. Fifth trainable weight tensor 144 comprises at least one fifth trainable weight 146. As in the above-described embodiments, each of the first through fifth trainable weights may be equal or different in value and in number from each of the other trainable weights of the other trainable weight tensors.

Each parallel processing network of the fourth embodiment further comprises a third, or output, layer which, collectively, for all the parallel processing networks, is designated as 148 for receiving the second input tensor. Third layer 148 includes third processing means for transforming the second input tensor on the fifth trainable weight tensor. The third processing means comprises at least one third processing node 150 as shown in FIG. 5. Third processing node 150 transforms second input tensor 142 on the fifth trainable weight tensor 144, thereby comparing the first known output with the first unknown output. As a result of the transformation produced by the third processing means, a resultant output 152 as shown in FIG. 5, is produced. The resultant output is indicative of the degree of similarity between the first known input tensor and the first unknown input tensor. This embodiment thus describes another way in which a known and an unknown input, such as images, may be compared according to the present invention.

The neural network according to the fourth embodiment of the present invention further comprises a selection criterion module for receiving and comparing the resultant output of each parallel processing network. A selection criterion module is shown at 154 in FIG. 5. The selection criterion module produces an outcome, shown at 156, based on a predetermined selection criterion. The outcome is indicative of the closest degree of similarity between the first known input tensor and the first unknown input tensor of each parallel processing network.

The neural network according to the fourth embodiment of the present invention further comprises a designating layer 158. Designating layer 158 designates the known input tensor having the closest degree of similarity to the unknown input tensor and displays it in region 160 of designating layer 158 as shown in FIG. 5. Thus, the embodiment of FIG. 5 represents another way in which the present invention compares a known input to an unknown input.

It should be noted that the dimensionality of each of the first, second and third layers of the fourth embodiment may be a scalar, vector, matrix or tensor of any degree. The first and second processing means of the second layer and the third processing means of the third layer may all perform a linear transformation, or they may all perform a non-linear transformation. Alternatively, the first, second and third processing means may perform any combination of linear and non-linear transformations. Also, it should be noted that each node has a trinable input bias, not shown.

In accordance with the fourth embodiment of the present invention, there is provided a method of comparing a known input comprising a first known input tensor to an unknown input comprising a first unknown input tensor. The method comprises the step of sending the known input and the unknown input to a plurality of parallel processing networks. The step of sending the known and unknown input to the parallel processing networks comprises the substep of transforming the first known input tensor on a first trainable weight tensor associated therewith to produce a first known output, where the first known output comprises a first known output tensor of at least rank zero. The sending step further comprises the substep of transforming the first unknown input tensor on the second trainable weight tensor to produce a first unknown output, where the first unknown output comprises a first unknown output tensor of at least rank zero. The sending step further comprises the step of combining the first known output tensor and the first unknown output tensor to form a second input tensor having a trainable weight tensor associated thedrewith, and transforming the second input tensor on the trainable weight tensor, thereby comparing the first known output with the first unknown output. A resultant output is produced, where the resultant output is indicative of the degree of similarity between the first known input tensor and the first unknown input tensor. The resultant output of each parallel processing network is compared, and an outcome indicative of the closest degree of similarity between the first known input tensor and the first unknown input tensor, based on a predetermined selection criterion, is produced. The known input tensor which has the closest degree of similarity to the unknown input tensor is then designated.

The invention will be further clarified by the following examples, which are intended to be purely exemplary of the invention.

EXAMPLE 1

Figure 6:
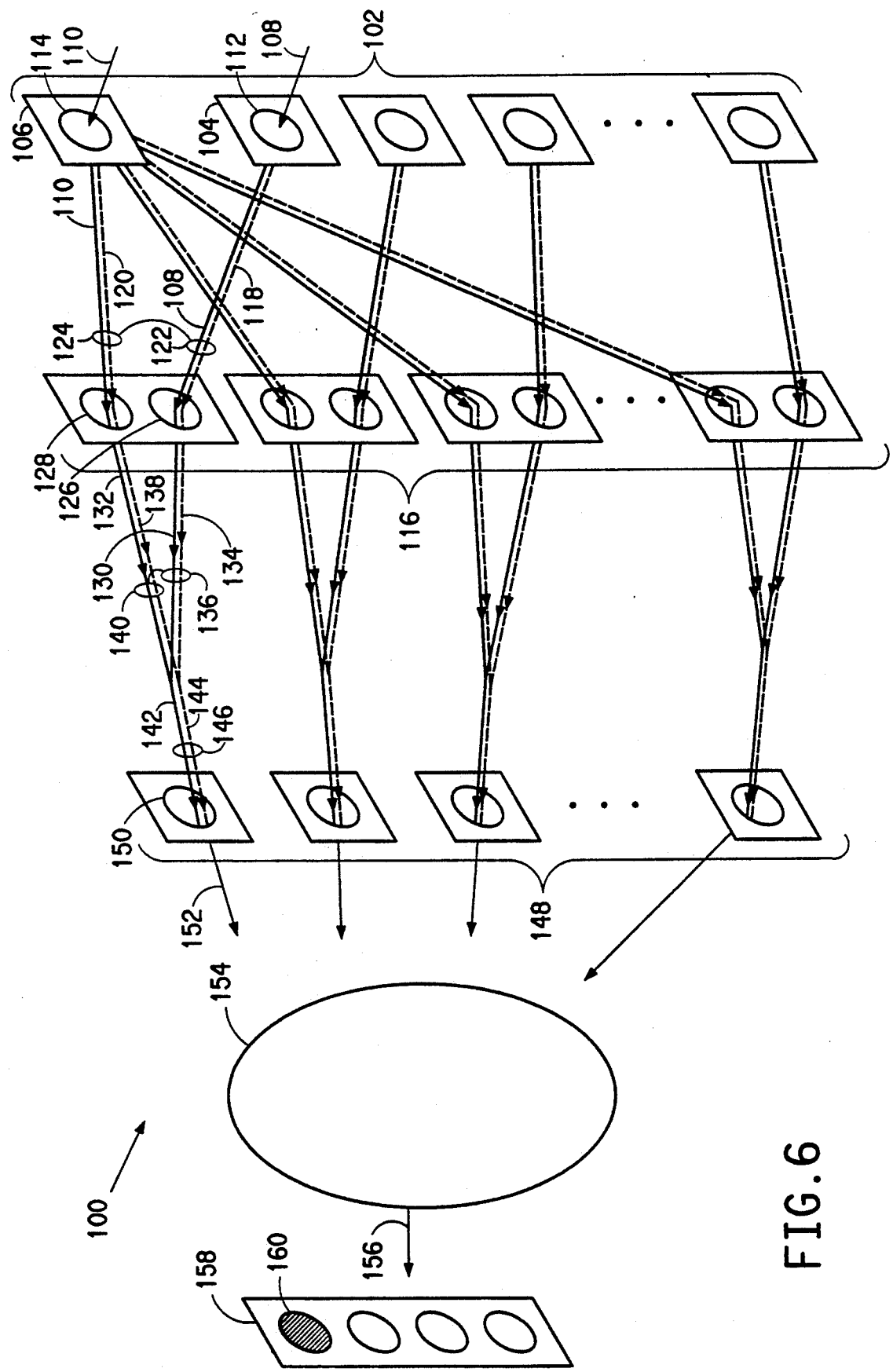
FIG. 6 is an isometric view of an implementation of the neural network of the embodiment of FIG. 5.

A specific implementation of the embodiment of FIG. 5 is shown in FIG. 6, and was run as described below. Like elements are designated with like reference numerals in FIG. 6, since FIG. 6 illustrates an actual reduction to practice of the embodiment of FIG. 5. In the implementation of FIG. 6, the known input tensor comprised the 26 capital letters of the alphabet. The unknown input tensor comprised the 26 capital letters of the alphabet which had small nuances in rotation, translation and scale in a first set (Set I) and the 26 capital letters of the alphabet having six different fonts in a second set (Set II). Each parallel processing network had a unique known input tensor, representing each letter of the alphabet. The unknown input tensor was common to all 26 parallel processing networks. Each letter of the known and unknown input tensors was represented by 289 pixels in a 17×17 binary array.

The second layer included 26 pairs of processing nodes. The first processing node of each pair was fully connected (i.e., every input data value in the known input tensor was fully connected to a processing node in the second layer with an associated weight) to the known input tensor for that parallel processing network. Similarly, the second processing node of each pair was fully connected to the unknown input tensor. The constraint was imposed that the first and second trainable weights associated with the first known input tensor and the first unknown input tensor, respectively, were identical as illustrated by the connection between 122 and 124 in FIG. 6. The third layer included 26 processing nodes, each of which was sparsely connected (i.e., each pair of processing nodes in the second layer was connected only to the processing node of the third layer of its respective network) to the first known and the first unknown output tensors of the second layer. The constraint was imposed that the third and fourth trainable weights associated with the first known output tensor and the first unknown output tensor respectively, were identical, as illustrated by the connection between 136 and 140 in FIG. 6.

The processing node of the third layer of each parallel processing network compared the first known output with the first unknown output and produced a resultant output which was indicative of the degree of similarity of the first known input tensor and the first unknown input tensor. Each of the resultant outputs from each parallel processing network was then fed to the selection criterion module, which performed a winner-take-all selection. During the training of the network of this implementation, the winner-take-all module was inoperative. Each parallel processing network was trained independently of the others to recognize only one letter and reject all the others. Once all the parallel processing networks were trained, the winner-take-all module became operative and accepted only the largest resultant output of all of the parallel processing networks. The winner-take-all module outputted a 5×1 array, giving a five bit modified ASCII representation of the recognized letters.

Figure 7:
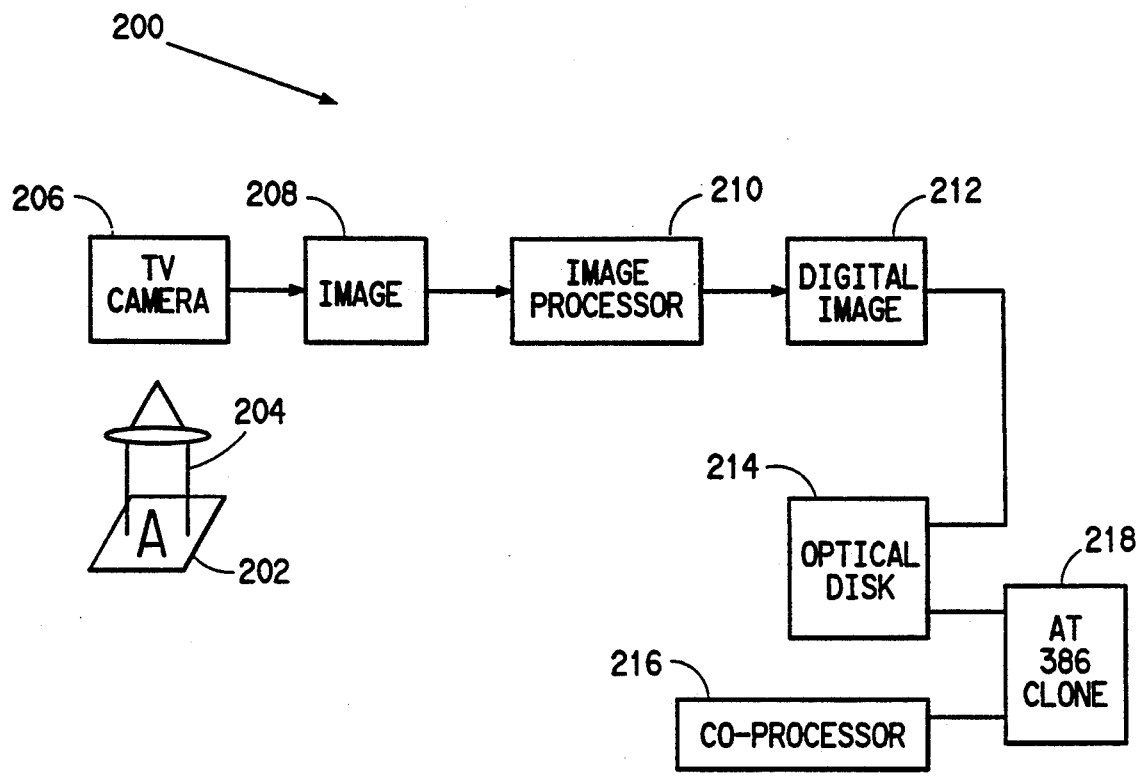
FIG. 7 is a block diagram of the hardware system used with the implementation illustrated in FIG. 6.

To generate the known and the unknown input tensors for the specific implementation of FIG. 6, a system illustrated generally at 200 in FIG. 7 was used. As shown in FIG. 7, a letter from a printed page 202 was sent through a macroscope 204, which focused the letter and re-imaged the letter onto a TV camera 206. TV camera 206 converted the re-imaged letter to an electrical signal. An image 208 was then outputted from the TV camera and sent to an image processor 210, which converted the image outputted from the TV camera into an ACSII formatted digital image 212 comprising a 17×17 array of pixels with 256 levels of grayness. This process was repeated for each of the 26 capital letters of the alphabet in the known input tensor and for each letter in the unknown input tensor, and the values for the known and unknown letters in the known and unknown input tensors were stored in an optical disk 214 as shown in FIG. 7. The particular optical disk used was an IBM 3363 with 200 MBytes. The stored known and unknown input tensors were then sent to a co-processor 216. The particular co-processor used in this implementation was a comercially available, floating point co-processor, sold under the trademark "DELTA FLOATING POINT PROCESSOR" by Science Applications International Corporation of San Diego, Calif. The co-processor was integrated with an IBM AT386 clone as shown at 218 in FIG. 7.

Figure 9:
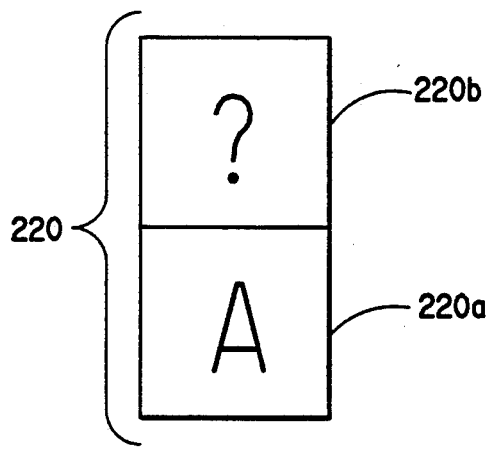
FIG. 9 is a schematic view of an image created by the system of FIG. 7.
Figure 8:
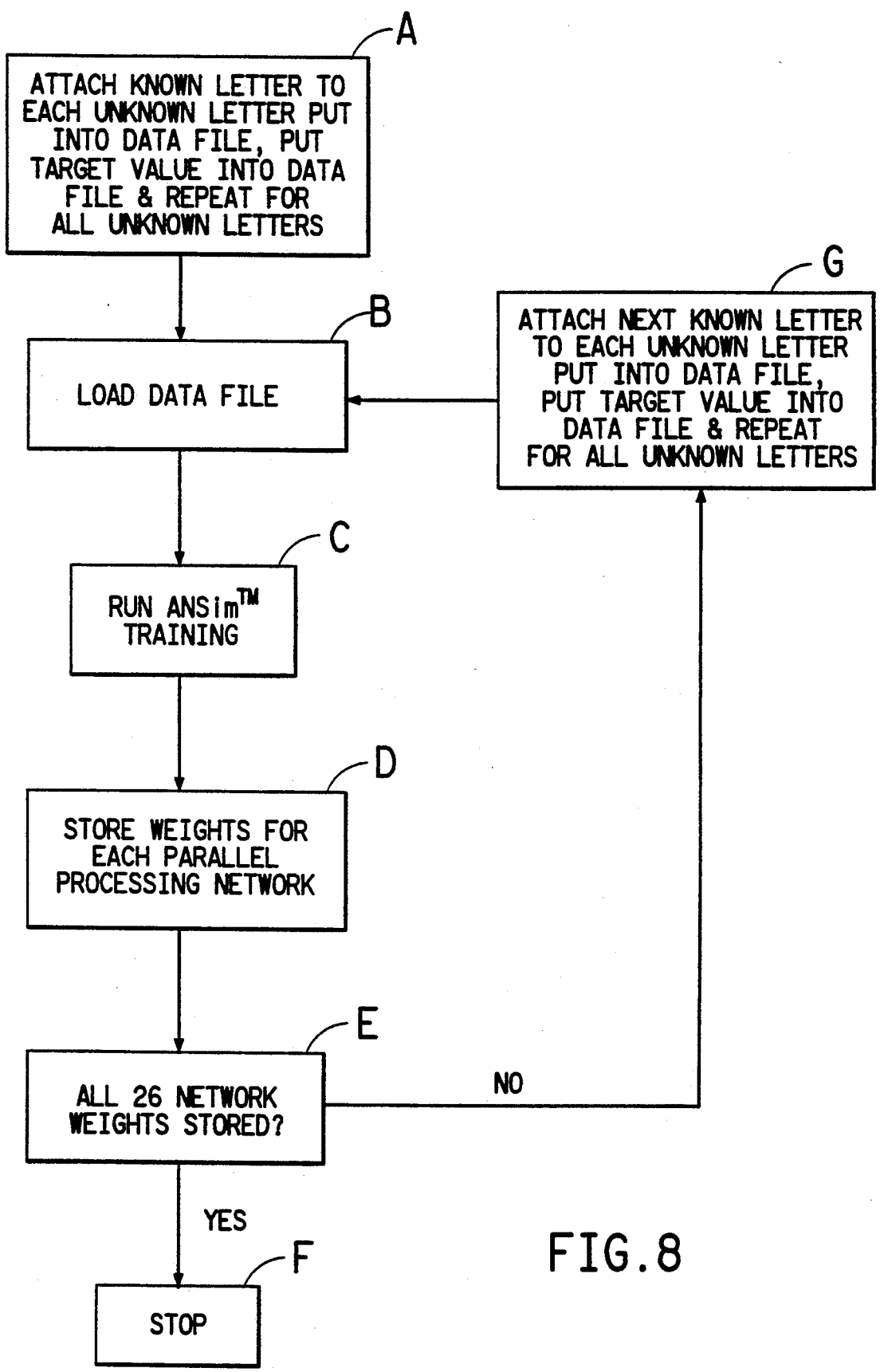
FIG. 8 is a flow chart showing the steps of the training phase of the implementation of FIG. 6.

FIG. 8 is a flow chart showing the steps of the training phase of the specific implementation of FIG. 6. During the training phase, each known letter in the known input tensor was attached to an unknown letter in the unknown input tensor for each parallel processing network. For example, the known 17×17 digital image for the letter A was attached to each unknown 17×17 digital image for an unknown letter to make a single image 220 as shown in FIG. 9 of two letters 220a and 220b—the known A and the unknown letter. The image of FIG. 9 comprised 34×17 pixels, having 256 gray levels. Each 34×17 pixel image was put in a data file. A target value, which denoted whether the known and the unknown letters belonged to the same class, was also put in the data file. The above procedure was performed for each letter in the unknown input tensor as indicated by block A in FIG. 8. The attached known and the unknown letters were then stored on the optical disk as illustrated by block B of FIG. 8. A commercially available computer program, sold under the trademark "ANSim", (hereinafter referred to as ANSim), by Science Applications International Corporation was then run as illustrated by block C for the data file. Specifically, a function of ANSim, "Back Propagation with Shared Weights" was run for training. The function calculated and stored the weights for each parallel processing network. The trainable weights were stored for each parallel processing network as shown in block D of FIG. 8. Block E asks if the weights of all 26 parallel processing networks have been stored. If so, the process was stopped, as illustrated in block F of FIG. 8. If not, then the next known letter was attached to the next unknown letter to create a 34×17 pixel image as shown in block G, and steps B-E were repeated for that parallel processing network.

Figure 10:
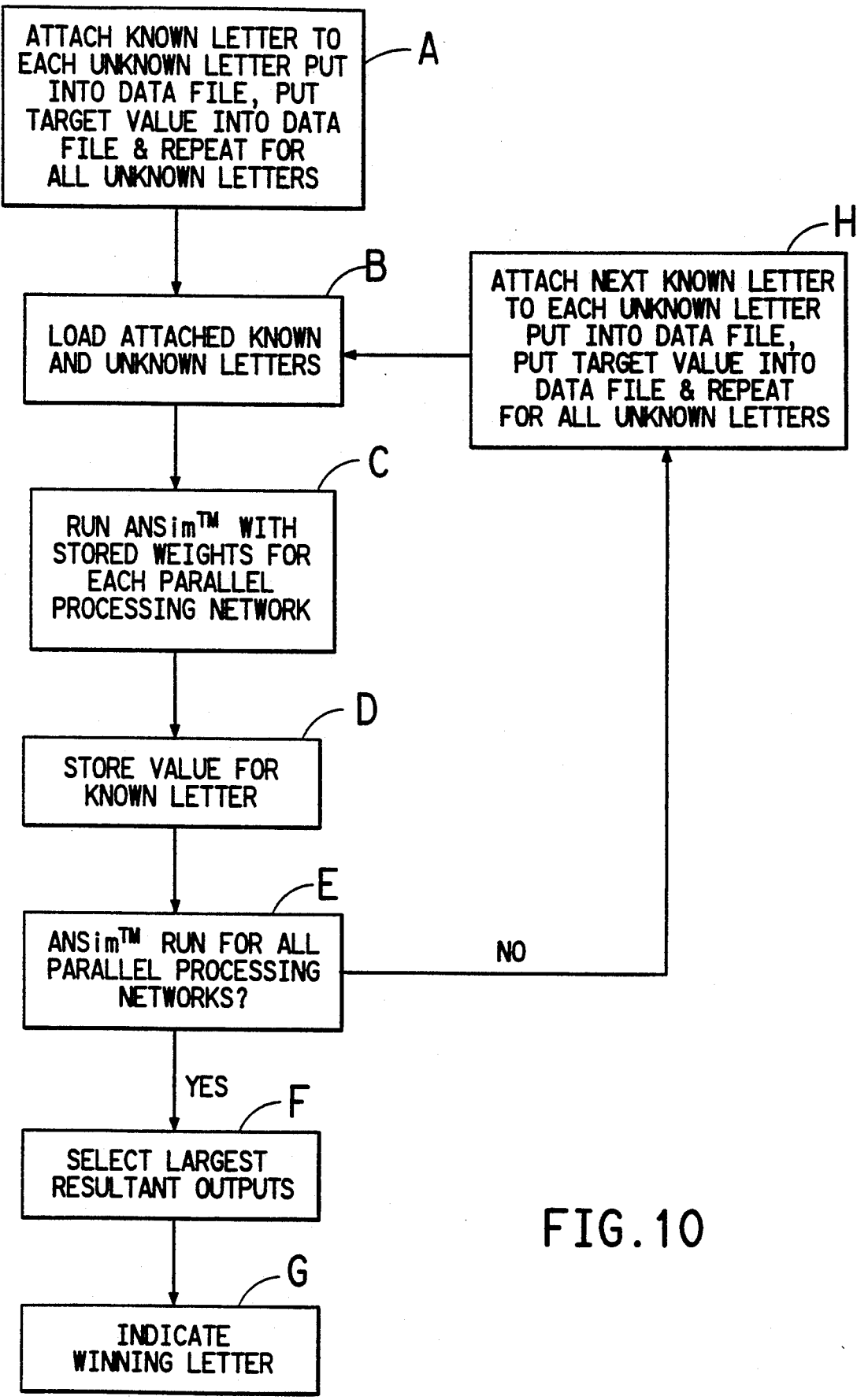
FIG. 10 is a flow chart showing the steps of the testing phase of the implementation of FIG. 6.

A flow chart showing the steps in the testing phase for the specific implementation of FIG. 6 is shown in FIG. 10. During the testing phase, a known letter in the known input tensor was attached to each unknown letter in the unknown input tensor to create a 34×17 pixel image. During the testing phase, the unknown letters were different from the unknown letters in the training phase. Each 34×17 pixel image was put in a data file. A target value was also put in the data file. The above procedure was performed for each letter in the unknown input tensor as indicated by block A in FIG. 10. The data file was then stored on the optical disk as illustrated by block B of FIG. 10. The "Back-Propagation with Shared Weights" ANSim function was then run for a known letter with the stored weights from the training phase for each parallel processing network as illustrated by block D in FIG. 10 to produce an output value for each network. Block E in FIG. 10 asks if ANSim has been run for all the parallel processing networks. If so, then the largest resultant outputs of all the parallel processing networks are selected as indicated in block F of FIG. 10, and the winning letter was indicated as illustrated in block G. If not, then the next known letter was attached to the unknown letter to create a 34×17 pixel image for each parallel processing network as illustrated in block H.

In the first Example, the network of FIG. 6 was trained on Training Set I. In general, the error measure for training is the RMS error of the difference between the target and network output values over all of the training data set. Another measure also used is the maximum output unit error (MOUE), which is the absolute value of the maximum linear difference of the target and output values over all of the training set. The RMS error gives an average performance figure of merit, and the MOUE specifically flags the failure of the network to recognize at least one character. After an average of 340 training iterations per parallel processing network, the RMS error range was [0.025,0.043] and the MOUE error was 0.099. The subsequent recognition rate during feedforward testing of Training Set IB was 100.0%. This network therefore was capable of learning the training set. The recognition rate for Testing Set IB was 99.2%.

For Training Set I in Example 1, after 10287 training iterations of the data, the RMS error was 0.111, the MOUE was 0.999, and the character recognition rate was 93.9%. The recognition rate for Testing Set I was 74%.

EXAMPLE 2

In the second Example, the network as described above with respect to FIGS. 6-10 was trained on Training set IIB. After 1000 training iterations per subnetwork, the RMS error range was [0.015,0.022] and the MOUE range was [0.029,0.041]. The subsequent recognition rate during feedforward testing of Training Set IIB was 100.0%. The recognition rate for Testing Set IIB was 91.9%.

For a network architecture performance comparison for Examples 1 and 2, these same input tensors were run on a standard, three-layer, fully-connected network. The input array of 17×17 (289) image pixels was fully connected to the second layer. The second layer was an array of 11×21 (231) processing nodes. The second layer was fully connected to the output array of 5×1 (5) processing nodes. There were a total of 236 processing nodes in the second and third layers. The total number of weight connections in this network was 68150, including threshold weights for each processing node.

For Training Set II in Example 2, after 2506 training iterations, the RMS error was 0.089, the MOUE was 0.999, and the recognition rate was 98.4%. The recognition rate for Testing Set II was 35.9%.

As can be seen from the above Examples, the performance of the sparse comparison neural network of the present invention was significantly improved compared to the standard, fully connected, feedforward, neural network which uses back-propagation techniques. The neural network according to the specific implementation as described in the embodiment of FIG. 6 of the present invention had lower RMS error and lower MOUE and had higher recognition rates for both training and testing. For the above examples, the size of the sparse comparison network was smaller by a factor of 3.0 in processing nodes and smaller by a factor of 4.5 in connection weights. In addition, the actual number of uniquely separate weights was decreased approximately 9.0, almost an order of magnitude.

An important perspective in applying the type of sparse networks of the embodiments of FIGS. 5 and 6 is that a large pattern recognition problem can be broken into multiple segments, where each segment represents a relevant feature of the original problem. Each of these segments can become a parallel processing network that is separately trained from the other parallel processing networks. The combined output of these parallel processing networks then forms an intermediate representation of the features of interest. A selection criterion such as the winner-take-all module described in the specific implementation of FIG. 6 or a higher level parallel processing network may be used to analyze this intermediate data representation and map it to a relevant output representation. Such a network then becomes a hierarchical sparse network of parallel processing networks.

The neural network in the first embodiment as shown in FIG. 2 may be conceptually extended to a neural network having a plurality of hidden layers and a plurality of output layers. Such a network is conceptualized in the embodiment of FIG. 11. A neural network according to a fifth embodiment of the present invention is shown generally at 300 in FIG. 11. Neural network 300 comprises a first, or input, layer 302. First layer 302 comprises a known component 304 and an unknown component 306 and receives a first known input tensor 308 and a first unknown input tensor 310. Known component 304 includes a first node 312 for receiving the first known input tensor, and unknown component 306 includes a second node 314 for receiving the first unknown input tensor. As in the embodiments described above, the first known input tensor and the first unknown input tensor may each comprise a first, or equal, number of known and unknown input data values. Alternatively, the first known input tensor may comprise a first number of known input data values and a second number of unknown input data values, where the first and second numbers are not necessarily equal to each other.

Figure 11:
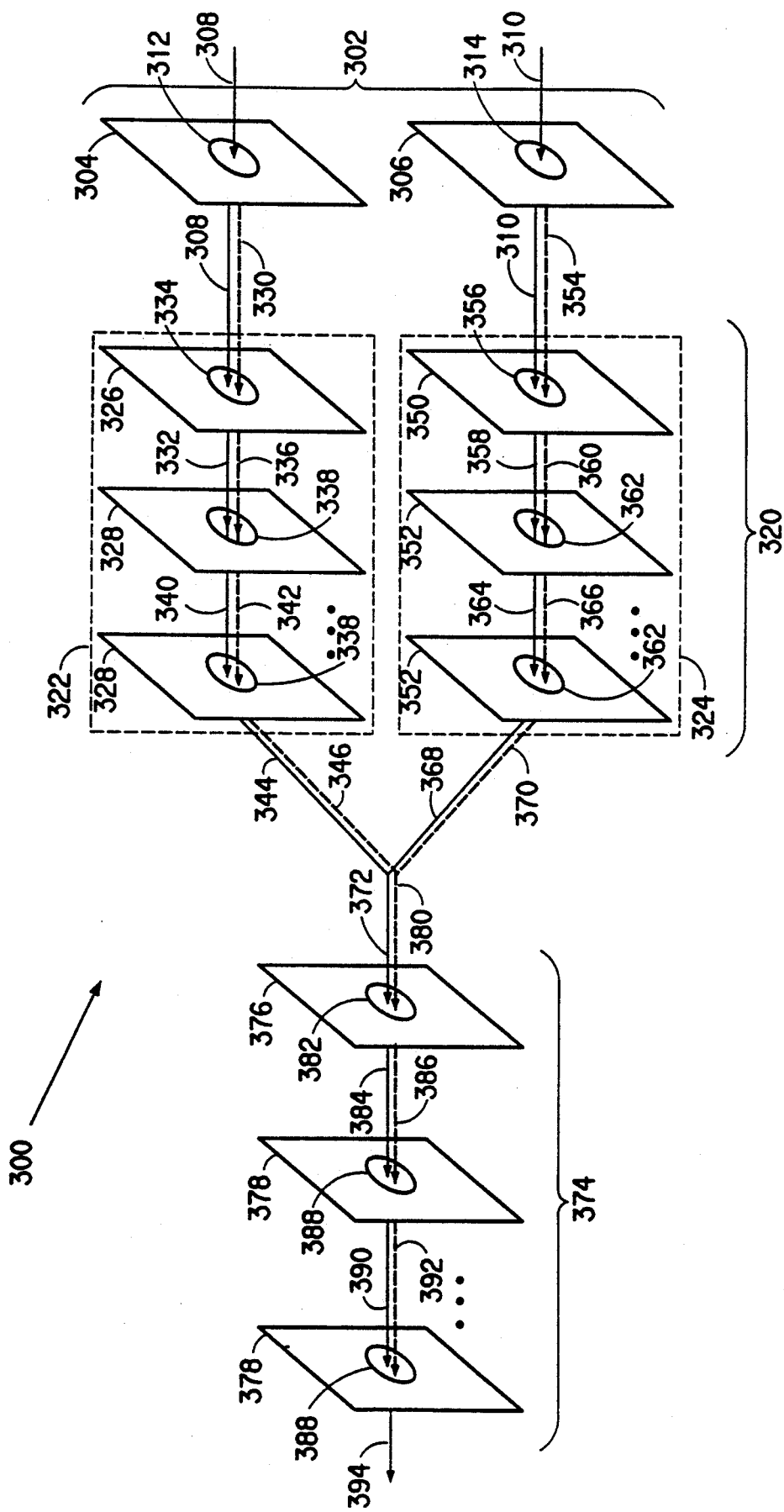
FIG. 11 is an isometric view of a neural network according to a still further embodiment of the present invention.

Neural network 300 comprises a second layer 320 including a first parallel processing network, shown generally at 322 and a second parallel processing network, shown generally at 324. First parallel processing network 322 receives the first known input tensor, and second parallel processing network 324 receives the first unknown input tensor. First parallel processing network 322 comprises a first intermediate layer 326 and at least one successive intermediate layer 328 as shown in FIG. 11. First intermediate layer 326 has at least one first trainable weight tensor 330 associated with the first known input tensor and includes first processing means for transforming the first known input tensor on the first trainable weight tensor to produce a first known output. The first known output comprises an intermediate known input tensor 332 of at least rank zero for the next successive intermediate layer as shown in FIG. 11. The first processing means comprises at least one first processing node 334 as shown in FIG. 11.

Each successive intermediate layer has at least one first respective intermediate trainable weight tensor 336 associated with the intermediate known input tensor thereto. Also, each successive intermediate layer comprises first respective intermediate processing means for transforming the intermediate known input tensor on the first intermediate trainable weight tensor associated therewith to produce a respective known intermediate output. The first respective intermediate processing means comprises at least one first respective intermediate processing node 338 as shown in FIG. 11. Each known intermediate output comprises a known intermediate output tensor 340 with a trainable weight tensor 342 associated therewith of at least rank zero, and the known intermediate output of the last successive intermediate layer comprises a last successive intermediate known output tensor, shown at 344, of at least rank zero. The last successive intermediate known output tensor has a third trainable weight tensor 346 associated therewith.

Second parallel processing network 324 comprises a first intermediate layer 350 and at least one successive intermediate layer 352. First intermediate layer 350 has at least one second trainable weight tensor 354 associated with the first unknown input tensor and includes second processing means for transforming the first unknown input tensor on the second trainable weight tensor to produce at least one first unknown output. The second processing means comprises at least one processing element 356. The first unknown output comprises an intermediate unknown input tensor 358 of at least rank zero for the next successive intermediate layer having an intermediate trainable weight tensor 360 associated therewith. Each successive intermediate layer comprises respective second intermediate processing means for transforming the intermediate unknown input tensor on the second intermediate trainable weight tensor associated therewith to produce a respective unknown intermediate output. The second intermediate processing means comprises a second intermediate processing node. The unknown intermediate output comprises an unknown intermediate output tensor 364 of at least rank zero, and has an unknown intermediate trainable weight tensor 366 associated therewith. The unknown intermediate output of the last intermediate layer comprises a last successive intermediate unknown output tensor 368 of at least rank zero having a fourth trainable weight tensor 370 associated therewith. The last successive intermediate known and unknown output tensors are combined to form a second input tensor 372.

The neural network according to the fifth embodiment of the present invention also comprises a third layer for receiving the last successive intermediate known output tensor and the last successive intermediate unknown output tensor. A third layer 374 is shown in FIG. 11 and comprises a first results layer 376 and at least one successive results layer 378. First results layer 376 has at least one fifth trainable weight tensor 380 associated with the second input tensor. First results layer 376 includes third processing means for transforming the second input tensor on the fifth trainable weight tensor to produce a first resultant output, thereby comparing the first known input tensor and the first unknown input tensor. The third processing means comprises a third processing node 382. The first resultant output comprises a first resultant input tensor 384 of at least rank zero for the next successive results layer. The first resultant input tensor has a successive results trainable weight tensor 386 associated therewith. The next successive results layer comprises successive results processing means for transforming the first resultant input tensor on the successive results trainable weight tensor associated therewith to produce a further resultant output, thereby further comparing the first known input tensor and the first unknown input tensor. The successive results processing means comprises a successive results processing node 388. The further resultant output comprises a respective resultant input tensor 390 of at least rank zero for the next successive results layer, and the resultant input tensor has a resultant input trainable weight tensor 392 associated therewith. The further resultant output of the last successive results layer, shown at 394 in FIG. 11, comprises a final resultant output. The final resultant output is indicative of the degree of similarity between the first known input tensor and the first unknown input tensor.

In the fifth embodiment of the present invention as described above, the number of layers in the first and second parallel processing networks of the second layer and the number of layers in the third layer may be, but are not necessarily, equal to each other. As in the above-described embodiments, each of the trainable weights may be equal or different in value and in number from each of the other trainable weights of the other trainable weight tensors. Also, the dimensionality of each of the first, second and third layers of the first embodiment may be a scalar, vector, matrix or tensor of any degree. The first and second processing means of the second layer and the third processing means of the third layer may all perform a linear transformation, or they may all perform a non-linear transformation. Alternatively, the first, second and third processing means may perform any combination of linear and non-linear transformations. Also, it should be noted that each node has a trainable input bias, not shown, as in the above embodiments.

The following error derivative equations have been derived in order to implement the embodiment of FIG.

11. For the general comparison network topologies shown in FIG. 11, the feedforward equations follow straightforwardly in an obvious manner from equations (1)–(17), and the feedback equations follow straightforwardly with the addition of the equations given below.

For networks with greater than three layers (n>3), the additional error derivatives have the same functionality as the second layer derivatives of the three-layer network of the embodiment of FIG. 2. For layer m of an n layer network, where m>1, the derivatives are as follows:

$$\frac{\partial E(A1)}{\partial Wm(Xm, Ym, Xm+1, Ym+1)} = \quad (20)$$

$$Gm(Xm, Ym)*A3(Xm+1, Ym+1)$$

and $$\frac{\partial E(A1)}{\partial WTm(Xm, Ym)} = Gm(Xm, Ym) \quad (21)$$

where, $$Gm(Xm, Ym) = \Sigma Gm - 1(Xm - 1, \quad (22)$$

$$Ym - 1)*Wm - 1(Xm - 1, Ym - 1, Xm, Ym)*\dot{F}(Sm(Xm, Ym))$$

$$Xm - 1 = [1, Xm - 1M]$$
$$Ym - 1 = [1, Ym - 1M]$$

$$\dot{F}(Sm(Xm, Ym)) = \frac{\partial F(Sm(Xm, Ym))}{\partial Sm(Xm, Ym,)} \quad (23)$$

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the general inventive concept as defined by the appended claims and their equivalents.

We claim:

1. An object recognition system for recognizing a known object in an image, comprising:
   (a) means for generating a first known tensor representation of an image of at least one known object, the known object being represented by a first known tensor and for generating a first unknown tensor representation of an image of at least one candidate, unknown object, the unknown object being represented by a first unknown tensor;
   (b) a comparison neural network comprising a plurality of parallel processing networks, each parallel processing network including:
      (i) a first layer including a first input node for receiving the first known tensor and a second input node for receiving the first unknown tensor,
      (ii) a second layer for receiving the first known and unknown tensors, the second layer having at least one first trainable weight tensor associated with the first known tensor and at least one second trainable weight tensor associated with the first unknown tensor, the second layer including first processing means for transforming the first known tensor on the first trainable weight tensor to produce a first known output, the first known output comprising a first known output tensor of at least rank zero having a third trainable weight tensor associated therewith, the second layer further including second processing means for transforming the first unknown tensor on the second trainable weight tensor to produce a first unknown output, the first unknown output comprising a first unknown output tensor of at least rank zero having a fourth trainable weight tensor associated therewith, the first known output tensor and the first unknown output tensor being combined to form a second input tensor having a fifth trainable weight tensor associated therewith,
      (iii) a third layer for receiving the second input tensor, the third layer including third processing means for transforming the second input tensor on the fifth trainable weight tensor, thereby comparing the first known output with the first unknown output and producing a resultant output, wherein the resultant output is indicative of the degree of similarity between the first known tensor and the first unknown tensor;
   (c) a selection criterion module for receiving and comparing the resultant output of each parallel processing network, the selection criterion module producing an outcome based on a predetermined selection criterion, wherein the outcome is indicative of the closest degree of similarity between the known object and the candidate, unknown object; and
   (d) a designating layer for designating the candidate object having the closest degree of similarity to the known object.

2. The neural network as claimed in claim 1, wherein the first known tensor for each parallel processing network is different.

3. The neural network as claimed in claim 1, wherein the first unknown tensor for each parallel processing network is the same.

4. A method of recognizing a known object in an image, comprising the steps of:
   (a) generating a first known tensor representation of an image of a known object for each of a plurality of parallel processing networks, the known object being represented by a first known tensor;
   (b) generating a first unknown tensor representation of an image of at least one candidate, unknown object for each of the parallel processing networks, the unknown object being represented by a first unknown tensor;
   (c) transforming the first known tensor on a first trainable weight tensor associated therewith to produce a first known output for each parallel processing network, the first known output comprising a first known output tensor of at least rank zero;
   (d) transforming the first unknown tensor on a second trainable weight tensor to produce a first unknown output for each parallel processing network, the first unknown output comprising a first unknown output tensor of at least rank zero;
   (e) combining the first known output tensor and the first unknown output tensor to form a second input tensor for each parallel processing network, the second input tensor having a third trainable weight tensor associated therewith;
   (f) transforming the second input tensor on the third trainable weight tensor for each parallel processing network, thereby comparing the first known output with the first unknown output;
   (g) producing a resultant output for each parallel processing network, wherein the resultant output is indicative of the degree of similarity between the first known tensor and the first unknown tensor;
(h) comparing the resultant output of each parallel processing network;
(i) producing an outcome indicative of the closest degree of similarity between the known object and the candidate, unknown object; and
(j) designating the candidate object having the closest degree of similarity to the known object.

* * * * *